United States Patent Office 3,462,524
Patented Aug. 19, 1969

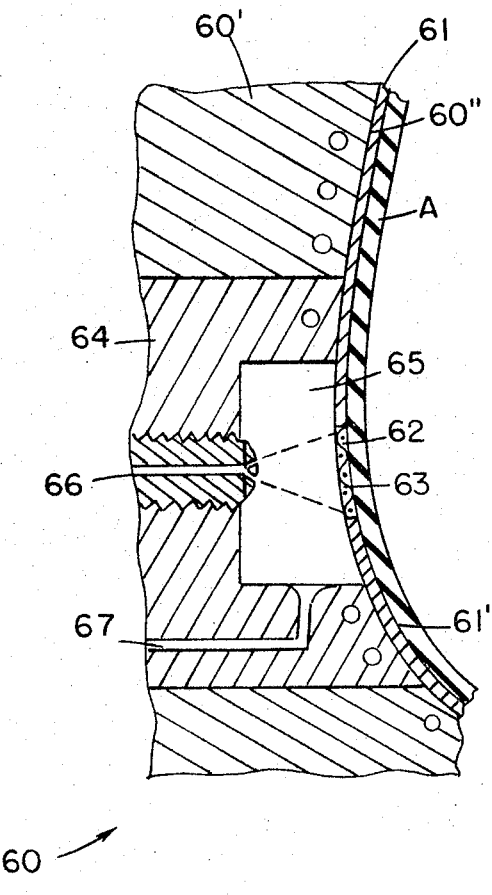

3,462,524
MOLDING TECHNIQUES AND APPARATUS
Jerome H. Lemelson, 85 Rector St.,
Metuchen, N.J. 08840
Filed Dec. 29, 1964, Ser. No. 421,817
Int. Cl. B29c 9/00
U.S. Cl. 264—255         4 Claims

ABSTRACT OF THE DISCLOSURE

An apparatus and method are provided for decorating molded articles in the mold or die in which they are formed, thereby eliminating the need to rehandle and reposition the article to effect such decoration. The mold or die is provided with a sub-cavity containing means such as a spray nozzle for flowing decorating material to the surface of the article disposed against the mold or die cavity through an opening such as provided by a mask secured to the mold wall.

---

This invention relates to fabricating composite articles of manufacture and, in particular to the selective surface coating of articles such as produced in a mold. An important aspect of this invention is to provide molding apparatus which is operative to mold an article to shape and, without removing the article from the mold, automatically decorate or selectively coat the surface of said article.

It is frequently required to decorate articles of manufacture which are fabricated by molding to enhance their utility and improve their appearance. Multiple operations are required which include, in addition to molding and transferring the article out of the mold, repositioning same in or on a fixture or conveyance and selectively positioning and operating one or more decorating devices such as spray guns, screening means, printing cuts or the like with respect to the surface of the molded article. Intermediate steps may also include handling and operating on the molded article to condition it to receive decorating material, finish or clean its surface, dry the decorative material, etc. Frequently in handling the article, the coating or finish is smeared or caused to run resulting in a discarded piece or the need to recondition same prior to a new attempt at finishing.

It is, accordingly, a primary object of this invention to provide an improved method and apparatus for combining the operations of molding and decorating articles of manufacture in the mold in which they are shaped.

Another object is to provide an improved method and apparatus for selectively coating molded articles of manufacture with decorative and other materials.

Another object is to provide an apparatus and method for simultaneously molding and decorating articles of manufacture immediately after molding the article and prior to removing same from the mold so as to eliminate the need to reposition the article relative to special decorating apparatus.

Another object is to provide an improved method of surface decorating molded articles of manufacture while the material thereof is in a semi-molten condition so as to improve the bond between the decorating material and the article.

Another object is to provide an apparatus for decorating blow molded articles as they are formed to shape in a mold and before the material thereof has completely solidified in the mold so as to eliminate the need for specially preparing the surface of the molding to receive and retain decorative material thereafter.

Another object is to provide an improved method and apparatus for decorating sheet materials which are formed in a die or mold immediately after the formation thereof and while still in said die or mold so as to eliminate the need to decorate same thereafter.

Another object is to provide apparatus for molding and decorating articles as they are molded and while solidifying in the mold so as to eliminate the need for further handling and preposition said articles and to effect said multiple molding and decorating functions in substantially the same time it takes to mold the article.

With the above and such other objects in view as may hereafter more fully appear, the invention consists of the novel methods and constructions, combinations and arrangements of parts as will be more fully described and illustrated in the accompanying drawings, but it is to be understood that changes, variations and modifications may be resorted to which fall within the scope of the invention as claimed.

The single drawing is a cross-sectional view of a fragment of a mold or die having a molding material disposed against the forming surface thereof and also showing spray means for decorating a portion of the surface of the article disposed in said mold or die.

In the drawing is shown a structure in a mold or die 60 which is operative to cooperate in the formation of an article from sheet or thin walled material deformed against a portion of the wall thereof and to simultaneously coat or decorate a portion of the surface of the deformed material. The mold 60 comprises a base member 60' having a shell-like insert or form 61 secured to a face 60'' thereof. The outer face 61' of the insert member 61 defines the molding or shaping surface against which the sheet-like article A is deformed. Assembled with base 60 and defining support for a portion of the rear face of insert member 61 is a second insert 64 which is preferably removable therefrom. Insert 64 defines a sub-cavity 65 behind form 61 and mounts a nozzle 66 which terminates a supply of decorating or coating material to be sprayed or otherwise dispensed from the end of said nozzle through an opening or openings 62 in the form 61 aligned with the nozzle and chamber 65.

If the through and through opening or openings 62 in shell-like form 61 are small with respect to the outer surface 61' of insert 61 then, depending on the flow characteristics of the material defining article A and the manner in which it is deformed, little if any deformation of the material defining said article A will be effected into the opening or openings 62. In certain molding or die-forming operations, that portion of the sheet or wall of material or article A which is aligned with openings 62 may be deformed partly into or through said openings to provide raised portions of the surface of the article which are decorated and which are desirable insofar as appearance is concerned.

Extending through insert 64 and communicating with chamber 65 is a passageway 67 which is operative to serve one or more of a plurality of functions. Vacuum applied to passageway 67 may be operative to remove excess material sprayed or flowed from nozzle 66 which does not adhere to the surfaces of the article or insert 61.

In certain combined forming and decorating operations utilizing apparatus of the type provided in the drawing, it may be desirable to prevent the sheet or parison molding material from flowing into or through the openings 62 in form 61. Accordingly, a screen 63 made of fine metal wire is shown disposed across opening 62 and may be secured to the front or rear surfaces of member 61 or have its border portions integrally embedded between the front and rear surfaces of member 61. The screen member 63 may be welded or bonded to either surface of the insert 61 or to the front surface 64' of insert 64 and may or may not be operative to affect the shape or pattern of the material deposited on the surface of the article A.

Other features of the apparatus illustrated in FIG. 8 include the provision of means for easily and rapidly assembling the various components for repair, cleaning and changeover functions. Shell-like insert, for eaxample, is preferably joined to the mold base 60' and/or insert 64 by pins or fasteners (not shown) which permit it to be easily removed therefrom by manual or automatic means. Similarly, insert 64 is preferably adapted to be removed and replaced as is nozzle 66 which is shown externally threaded and seating in a threaded bore in block 64. In certain applications, member 64 may be eliminated wherein the mold base 60' itself may be bored or otherwise shaped to retain the nozzle and perform as described. Sub-cavity 65 may be of any suitable shape varying from the shape of the bore in which the nozzle 66 is secured to substantially larger than illustrated.

Nozzle 66 may be operative in a number of modes. It may be used to dispense atomized droplet material or particulate material against the surface of the article or sheet exposed through opening 62 thereto. If thermoplastic particulate material such as powdered polyethylene, nylon, polypropylene or the like is dispensed through the nozzle 66 it may be melted in situ against the surface of the article particularly if the material thereof is still in the hot or semimolten condition rendered to form same in the mold. The quantity of particulate material dispensed from nozzle 66 may be sufficient to provide a contiguous coating thereof on the area defined by opening 65.

I claim:
1. Article decorating apparatus comprising:
   (a) a mold having a cavity with a wall portion operative to define the shape of material to be molded in said cavity,
   (b) means for shaping material to define an article in said mold,
   (c) a passageway in said mold wall terminating at the cavity,
   (d) a supply of fluid coating material operatively connected to said passageway,
   (e) spray coating means disposed in said passageway adjacent said cavity for transferring said fluid material to the surface of said article disposed against said mold cavity wall and aligned with said passageway,
   (f) means for feeding coating material to said spray means and operating said spray means for selectively disposing said coating material onto a predetermined area of the surface of said article,
   (g) control means for said feeding means operative to cause the spray coating of a predetermined quantity of said coating material against said predetermined area of said article during a predetermined interval in a molding cycle.

2. Apparatus in accordance with claim 1, further including a sub-cavity in said mold wall terminating said passageway, and means spraying said coating material through said sub-cavity to a portion of the wall of said article aligned with said sub-cavity.

3. A method of decorating molded articles comprising:
   introducing a first molding material into a mold having a cavity defining a wall against which said material may form to the shape thereof,
   causing said molding material to conform to the shape defined by said cavity wall,
   solidifying said molding material to define a molded article, and while said molded article is still maintained within said mold, spraying a fluent second material through an opening in the mold wall against a predetermined area of the surface of the molded article and provide a surface design thereon, and
   removing said article from said mold.

4. A method of decorating articles in accordance with claim 3, in which said second material is sprayed through a mask disposed against the wall of the mold and shaped to conform to the shape of the surface design provided on the surface of said article.

References Cited

UNITED STATES PATENTS

| | | | |
|---|---|---|---|
| 3,194,857 | 7/1965 | White | 264—98 X |
| 1,776,955 | 9/1930 | Sheras | 264—132 X |
| 2,022,587 | 11/1935 | Cunningham | 264—132 X |
| 2,601,700 | 7/1952 | Pinsky et al. | 264—132 X |
| 2,777,824 | 1/1957 | Leeds | 260—2.5 |
| 2,861,911 | 11/1958 | Martin et al. | |

JULIUS FROME, Primary Examiner

T. J. CARVIS, Assistant Examiner

U.S. Cl. X.R.

18—5